UNITED STATES PATENT OFFICE.

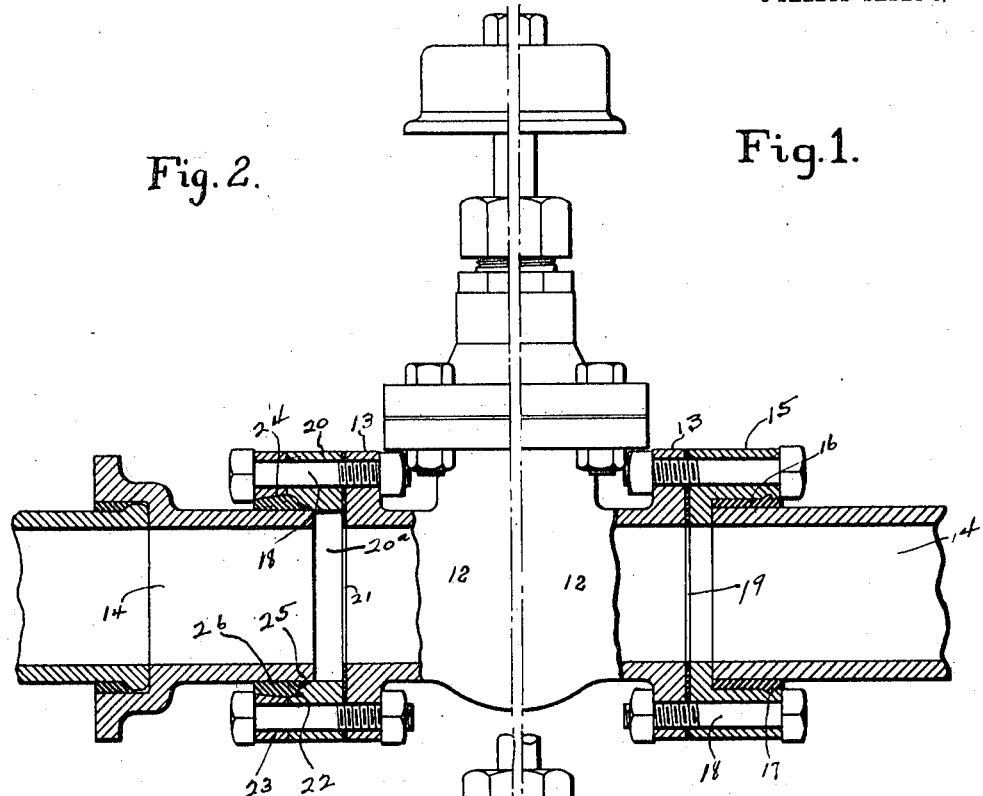
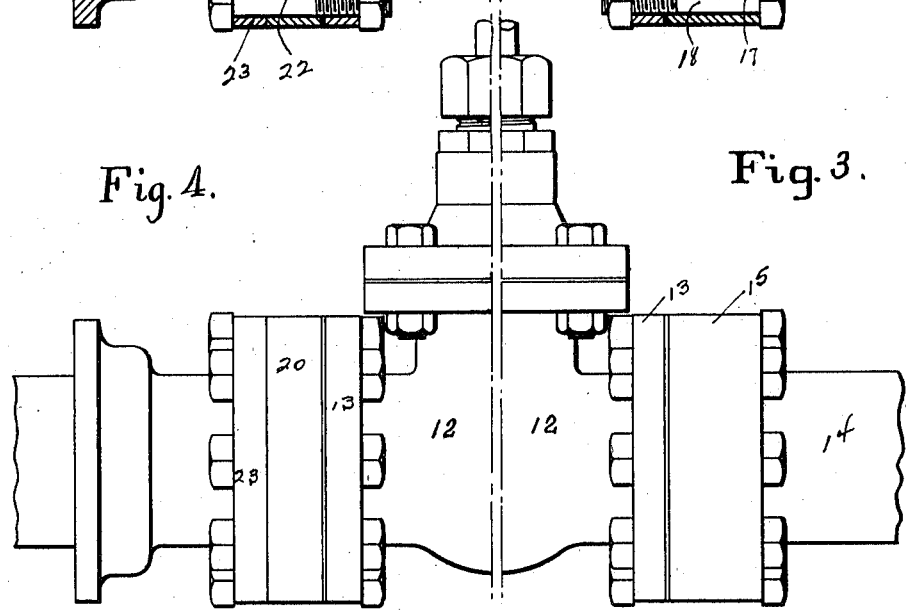

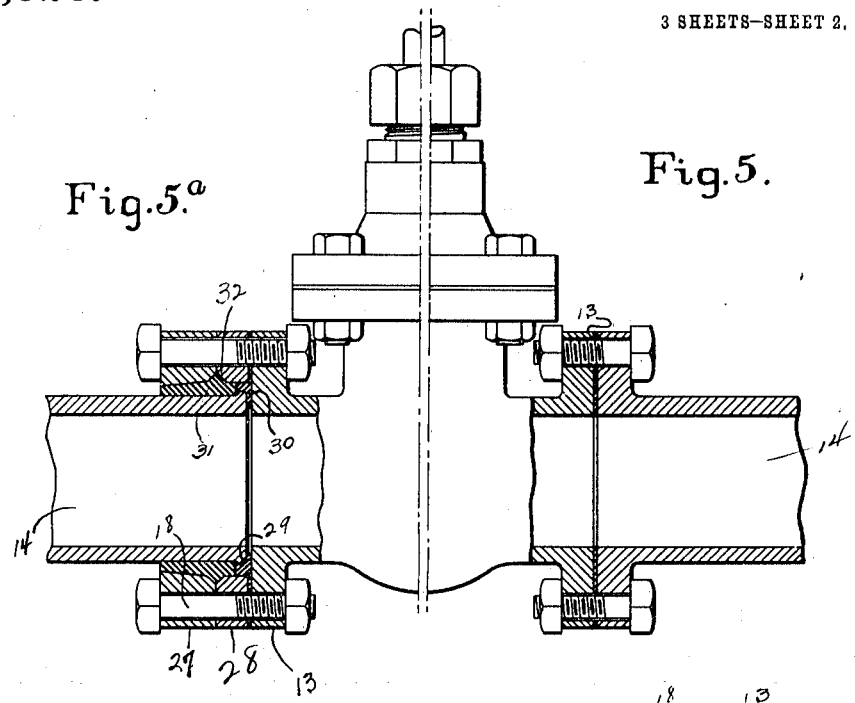
Fig.5.ª    Fig.5.
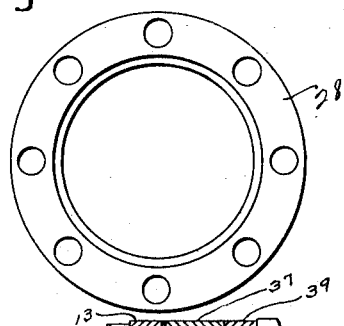
Fig.6.
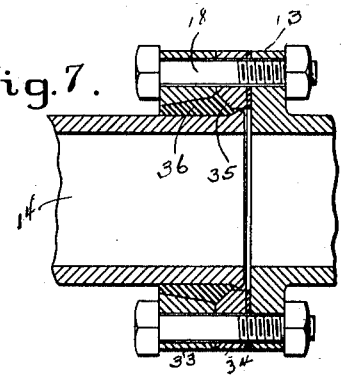
Fig.7.
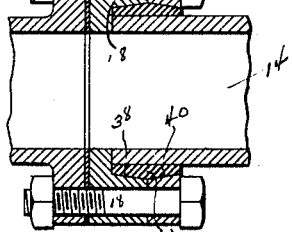
Fig.9.
Fig.8.
Witnesses.
Chester W. Hathaway.
Henry Plate
Inventors
Philip Mueller
John P. Mern.
by John L. Waddell
Attorney.

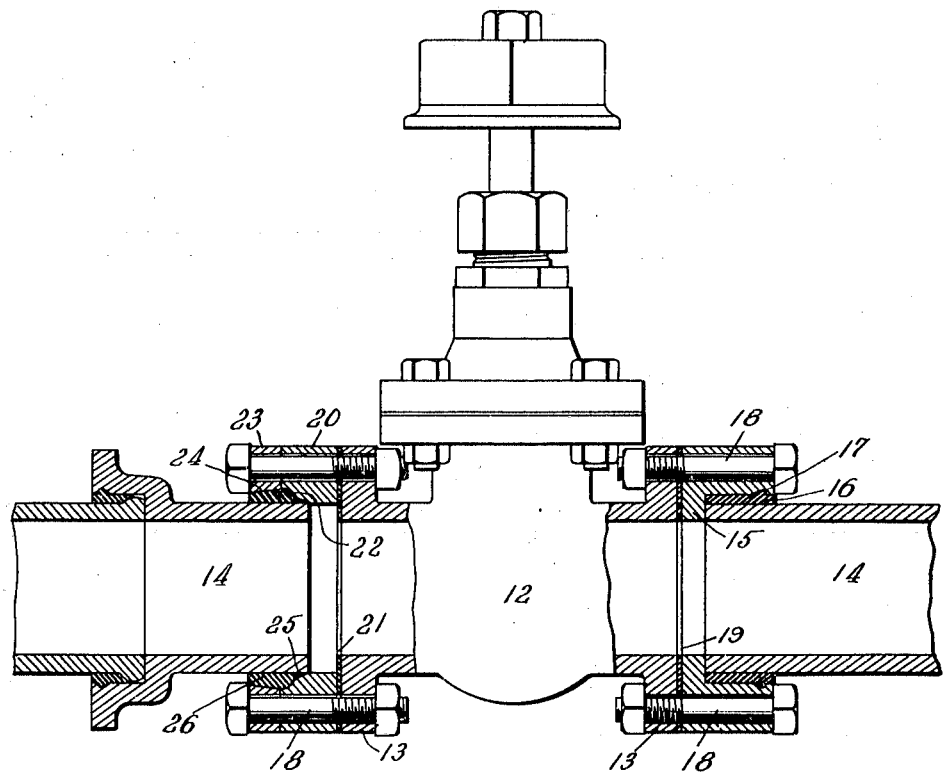

PHILIP MUELLER, OF DECATUR, ILLINOIS, AND JOHN P. MERN, OF NEW YORK, N. Y., ASSIGNORS TO H. MUELLER MFG. CO., OF DECATUR, ILLINOIS, A CORPORATION OF ILLINOIS.

CONNECTING-JOINT.

1,053,528.  Specification of Letters Patent.  Patented Feb. 18, 1913.

Application filed April 5, 1909. Serial No. 488,055.

*To all whom it may concern:*

Be it known that we, PHILIP MUELLER and JOHN P. MERN, citizens of the United States, and residents of Decatur, Macon county, and State of Illinois, and New York city, State of New York, respectively, have invented new and useful Improvements in Connecting-Joints; and our preferred manner of carrying out the invention is set forth in the following full, clear, and exact description, terminating with claims particularly specifying the novelty.

The present invention relates generally to pipe and valve fittings and connections, and particularly to means whereby a valve device or other insertible section or fitting may be readily interposed in or removed from position in a length of pipe, the connections which we have invented being of such character that replacing of a valve or fitting which is worn or deranged, or the substitution of a different type or form of valve or fitting may be accomplished quickly and with ease as compared with the ordinary types of valve and pipe fittings.

A further object of the present invention is to provide a connecting joint in which the packed connections between the valve or fitting heads and pipe ends after having been once formed may be left without breaking or disturbing them when it is desired to remove the valve or fitting, and the necessity of repacking and leading the joints each time the valve is removed is done away with.

In devices of an analogous kind which have hitherto been devised to a similar end the joint which has been used to connect opposed pipes has not been so constructed that it could, at all times, hold an inclosed packing in proper place and position when disunited from either of said pipes. This is an important advantage in a joint; it has been necessary to use a metallic packing or solder to unite a packing to a connecting pipe, and this has been utilized in the present invention, except that additional means are provided for disuniting either of two connected pipes in such a way that the packing will always be normally seated relatively to the incased pipe. A bolt is used in my invention which passes through apertures in two alined pipes; normally one end of the bolt is screw threaded and protrudes through the joint, and this same end is passed through an aperture in the pipe that it is desired to connect. A nut is mounted on said bolt which is adapted to engage either the outer face of said joint or of the flange of one of the pipes joined together; by means of this bolt we are enabled to clamp the two pipes together so that a packing can be suitably confined in place, and whereby we are enabled furthermore to cause the nut to hold the packing within its seating between the joint and an incased pipe.

In order that the invention may be clear to those skilled in the art we have shown in the accompanying drawings embodiments of our invention, although as these are merely illustrative and in no sense restrictive we do not limit ourselves to the particular embodiment shown and described, except so far as we are limited by the art to which the invention belongs.

This invention further contemplates the peculiar arrangement of the several forms of couplings herein disclosed wherein a coupling or fitting for valves, T's, crosses, and the like, in a line of pipe may be readily removed and replaced when it is necessary to repair the same, and wherein the valve, or the like may be replaced should the new valve be of different length from face to face of its abutting flanges than the valve removed. In carrying out this feature we have combined a pair of coupling members which are adapted to be permanently sealed upon the ends of the pipe line and to be detachably connected to the valve, or the like, which is removable. To effect adjustment of these coupling members to accommodate a valve of different width from face to face of its abutting flanges, we select as one of the pair of coupling members, a coupling member which may be adjusted toward and from the opposite coupling member, and which will coöperate therewith to seal the new valve in place.

In the drawings herewith Figure 1 is a view in elevation of one half of a valve connected up in accordance with our invention, certain parts being in section for clearness of illustration. Fig. 2 is a similar view of one half of the valve showing modified type of the connections. Fig. 3 is a side elevation of the valve and connections shown in Fig. 1. Fig. 4 is a similar view of the valve and connections shown in Fig. 2. Fig. 5 is a view similar to Fig. 1, showing a slight modification in the joint between the valve and pipe. Fig. 5ª is a view similar to Fig. 2, showing another modification of the invention. Fig. 6 is an end view of a joint flange. Fig. 7 is a detail sectional view of a slightly different form of joint from that shown in Fig. 5. Fig. 8 is a detail view of the joint packing shown in Fig. 5. Fig. 9 is a sectional view showing still another type of joint. Fig. 10 is a view in elevation, partly in section of a valve connected up between the coupling members disclosed in Figs. 1 and 2.

Referring to the drawings by numerals, like numbers indicating like parts in the several views, and having particular reference to Figs. 1 and 3, 12 denotes a fitting which, in the present disclosure is shown as a valve which may be of any suitable or desired type, the body of said valve 12 having at either end the flanges 13 suitably drilled or apertured with bolt holes.

It will be understood that the valve 12, shown in the present case, is merely typical of one form of fitting, it being obvious that other forms may be as readily inserted by the use of our invention.

The line of pipe in which the said valve 12 is placed is indicated by 14, and may be of any suitable or desired type and dimensions, it being observed that the pipe end in this instance is without flange or any special means for making connection with the valve heads 13. In fact the pipe 14 may be regarded as any conduit or pipe line of ordinary cylindrical form at some point in which it is desired to insert a valve.

In Fig. 1 it will be observed that we provide between the flanges 13 on the valve body and the pipe 14, a cup-shaped sleeve or collar 15, the internal bore of which is slightly larger than the diameter of the pipe 14, the end of said pipe 14 being entered within the cup of the sleeve 15 and bearing against the bottom thereof, the bore of the pipe 14 and that of the sleeve 15 registering, as will be clear.

The space between the wall of the cup-shaped sleeve 15 and the pipe 14 will be filled or packed with any suitable packing 16 which may be introduced in the usual manner, and in order to lock the packing 16 in place we preferably provide the wall of the sleeve 15 with a recess 17 of any desired form into which the packing 16 will flow and be locked against movement. It will be seen that the cup-shaped flange 15 is provided with bolt holes registering with the bolt holes in the flange 13 on the valve body, these registering bolt holes adapted to receive suitable securing bolts 18 which bind the parts together, and between the flanges 13 and the abutting face of the cup-shaped sleeve 15 we interpose a packing washer or ring 19 to seal the joint. By this construction it will be seen that the matter of making a joint between the valve 12 and the pipe 14 is a simple one. Whenever it is desired to secure the valve 12 to the end of a pipe a cup-shaped sleeve 15 of suitable gage will be placed in position, the parts bolted up by means of the bolts 18 and the suitable packing between the parts provided.

After the cup-shaped sleeve 15 has once been packed to the end of the pipe 14 we find that the valve 12 may be removed by taking out the bolts 18 without disturbing the joint between the sleeve 15 and the pipe 14, for the packing after being left in place some time will become united by corrosion with the adjacent parts, so that under ordinary circumstances removal of the valve will not break or disturb this joint, and the expense and delay of repacking such joint is avoided, although it will be understood that if for any reason the sleeve 15 is to be removed this can be readily done.

Referring now to Figs. 2 and 4 it will be seen that in forming this joint we provide two rings or flanges to form the packed joint and the connection between the valve flanges 13 and the pipe end 14. In this form of joint the ring 20 abuts the flange 13 on the valve body, an interposed annular washer 21 being provided to seal this joint, the said ring 20 having an inner peripheral bevel as shown at 22 at its outer end, a second ring 23 abutting the first ring 21 and having its inner wall beveled as shown at 24 so as to form in conjunction with the ring 20 a receiving chamber for packing between the rings and the pipe 14.

Referring to Fig. 10 of the drawing, a combination of a pair of the coupling members, for instance those disclosed in Figs. 1 and 2, is shown in connection with the valve 12 and the pipe 14. The manner of positioning the valve 12 between the coupling members on the pipe 14 is as follows: The ring 15 is first positioned upon the right hand end of the pipe 14, and located in such position by the filling 16. The rings 20 and 23 of the left hand side of the coupling are placed loosely upon the opposite end of the pipe 14 and moved back from the end thereof. The valve 12 is now inserted between the pipe ends, and is secured to the ring 15 by the bolts 18, as is disclosed in Fig. 1, when the separable rings 20 and 23 of the opposite coupling are moved out upon the left pipe end and clamped by the bolts 18 against the adjacent end of the valve 12. The valve having thus been brought into position, the coupling member to the left is sealed in position by pouring in the body of lead 26 in the usual manner. If it is desired to remove the valve from the pipe ring 14 it is only necessary to detach the bolts 18 from the coupling members and draw the valve 12 laterally from between the same.

Should, however, a valve be replaced in the pipe line which is of a different width from the valve first inserted, the outer ring 20 is separated from the ring 23 and the filling 26 by the insertion of a chisel between the two rings, this operation being readily effected by virtue of the beveled or inclined inner face of the ring 20 resting against the packing 26. After the removal of the ring 20, the ring 23 is then forced inwardly from the packing 26, thus exposing the entire outer surface of the latter, and enabling ready removal of the same by a chisel or the like. The new valve is now secured against the flange or ring 15 by the bolts 18, the rings 20 and 23 being moved outwardly into engagement against the adjacent end of the valve 12 and secured thereto by the bolts 18, as in the original positioning of the valve. The body of lead 26 is then poured in the usual manner into the chamber formed between the rings 20 and 23 and the pipe end 14. It is thus seen that with these coöperating coupling members it is only necessary to move and reset one of the members should the valves or the like be positioned in the main which differ in width from the valves which have been removed from the main.

Both of the rings 20 and 23 are apertured with bolt holes which register with the bolt holes in the flange 13 so that the same standard securing bolts 18 may be used to unite the parts.

The packing receiving chamber formed by the inner beveled walls of the rings 20 and 23 is designed to receive any suitable packing, as a packing of oakum 25, upon which is preferably placed a lead filling 26, this packing filling the chamber between the pipe 14 and the rings 20 and 23, forming an effective joint between the smooth end of the pipe and the rings. By forming the parts as described and packing the joint in the manner indicated, we find that the same permanency of union is secured as that described in connection with the joint represented in Fig. 1, so that after this joint is once made the valve 12 may be removed and unless considerable and unnecessary force is used no disturbance of the rings 20 and 23 and the packing will take place.

In Fig. 5 on the left side we have shown another type of joint in which the valve flanges 13 are secured by rings 27, 28, and the standard bolts 18 to the pipe 14, this pipe having a beaded end 29 which is packed with respect to the ring 28 and the valve flange 13 by a packing 30 of oakum, the joint between the pipe 14 and the rings 27 and 28 having the lead filling or packing, and the lead chamber is preferably of the form shown, namely inclined toward its center or toward the meeting point of the rings 27 and 28, which are so formed as to provide an annular depression or groove 32 into which the lead packing will flow so as to provide an annular rib on the packing 31 as clearly shown in the detail view Fig. 8. By thus forming the rings an effective lock for the packing is provided, and it will be seen, furthermore, that the oakum is engaged by the rib 29 on the pipe 14 so that after the joint is once formed it becomes in effect a permanent joint on the pipe 14, which will permit removal, replacement, or substitution of the valve 12 without the necessity of disturbing the sealing means each time this is done.

At the right side in Fig. 5 the pipe 14 is flanged as shown in a not unusual manner and joined to the flanges 13 on the valve body 12 by bolts.

In the form of the invention shown in Fig. 7 the rings 33 and 34 are somewhat similar to those shown in Fig. 5 and just described, except that the ring 34 is extended so as to lie close to the end of the pipe 14, and is provided with a beveled face 35 against which the lead packing 36 is driven, this packing completely filling and closing the close joint between the end of the pipe 14 and the surrounding ring 34. The ring 33 is beveled inwardly so as to form an overhanging wall for the lead filling 36 and insure this filling being held firmly in place; the rings 33 and 34 being joined to the valve body flanges 13 by the usual standard bolts 18 hereinbefore described.

In Fig. 9 we have shown a form of joint similar in its general features to the joint shown in Fig. 1, for it will be seen that in the joint shown in Fig. 9 a cup-shaped sleeve 37 is provided, the inner wall of this sleeve 37 being beveled outwardly as at 38, and a complementary ring 39 having an inwardly beveled wall 40 is provided, so that the packing 41 interposed between the pipe end 14 and the sleeve 37 and ring 39 will be locked against displacement by this double bevel wall; the parts being secured by the usual bolts 18.

From the foregoing it will be seen that we have devised a joint which is adaptable to the ready and easy interposition of a valve or other removable section or fitting at any point in a pipe line where it may be desirable to cut in a fitting without being forced to fit up the cut ends of the line of pipe with threaded on coupling members or elements peculiar or necessary to the particular valve or fitting to be inserted. Furthermore, the parts forming this joint may be set up and alined rapidly and at once secured and packed without the necessity of pipe wrench work or rotating of the pipe sections or the removable section to make the fitting, the only wrench work necessary being the setting up of the nuts on the securing bolts 18.

In addition to this it will be seen that after the joint has once been made it becomes practically a finished and special connection which may be left as a permanent fitting and the valve or insertible section removed for repairs or change without the necessity of disturbing the sealed joints and the consequent trouble of repacking.

We claim:

1. In combination with an interrupted line of pipe, and an insertible member adapted for positioning between the adjacent ends of the interrupted line of pipe, coupling members joining the ends of the valve member to the ends of said pipe and having annular recesses therein about the ends of the pipe, a filling poured into the recesses and adapted to seal the coupling members upon the ends of the pipe, and means engaging the insertible member and said coupling members for securing the insertible member between the innermost ends of the coupling members, one of said coupling members being in sections adapted to be separated to expose said filling after the same is set upon the pipe.

2. In combination with an interrupted line of pipe, and an insertible member adapted for positioning between the adjacent ends of the interrupted line of pipe, a coupling member engaging about one of the pipe ends and being spaced about the pipe to provide an annular recess about the same, a filling poured into said recess adapted to seal said coupling member upon the pipe end, and a second coupling member composed of complementary sections having oppositely inclined inner walls and being spaced about the opposite pipe end, a second filling poured into the space between said coupling sections and the opposite pipe end to seal said sections to the pipe end, and securing means engaging through said first coupling, and through both sections of the second coupling adapted for engagement with said insertible member to hold the same in place, the sections of said sectional coupling being adapted to be spread apart to expose the filling about said opposite pipe end whereby the filling may be easily removed from the pipe.

3. In combination with the spaced ends of a pipe line, and an insertible element adapted for securement between said ends, a pair of coupling members carried upon the opposing pipe ends and engaging the opposite ends of the insertible element, one of said coupling members being spaced about one of the pipe ends, a filling poured into the space between said coupling member and said pipe end to permanently seal said member to the pipe end, the other coupling member comprising a pair of ring sections having abutting faces and having oppositely inclined inner walls providing a substantial V-shaped interior groove, a filling poured into said groove and between said other coupling member and the opposite pipe end, and devices engaging through both coupling members and with the opposite ends of the insertible element and being adapted to secure the latter between the pipe ends, the rings of said other coupling being adapted to be separated whereby to expose said second filling for removing the same.

In testimony whereof, we have hereunto subscribed our signatures, this 15th day of March, A. D. 1909.

PHILIP MUELLER.
JOHN P. MERN.

Witnesses to the signature of Philip Mueller:
    GOLDIE M. PERRY,
    JOHN L. WADDELL.

Witnesses to the signature of John P. Mern:
    D. E. WRIGHT,
    W. F. LUMLEY.